United States Patent Office 3,514,399
Patented May 26, 1970

3,514,399
DRILLING FLUIDS CONTAINING IMIDAZOLINE SALTS
James R. Robinson, Nederland, Tex., assignor to Petrolite Corporation, Wilmington, Del., a corporation of Delaware
No Drawing. Continuation-in-part of application Ser. No. 396,366, Sept. 14, 1964. This application Apr. 1, 1969, Ser. No. 812,339
Int. Cl. C10m 3/26
U.S. Cl. 252—8.5          8 Claims

ABSTRACT OF THE DISCLOSURE

An aqueous drilling fluid characterized by the presence therein of a mixed dimer acid-monocarboxylic acid salt of an imidazoline in an amount sufficient to maintain the stability of the borewall and the borehole, the mixed dimer acid having predominately 36 carbon atoms (i.e. derived from $C_{18}$ acids).

In the preferred embodiment, the salts are prepared from a mixed dimer acid-acetic salt of an imidazoline derived from coconut oil fatty acids and a polyamine of the formula

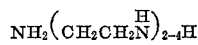

or mixtures thereof.

---

This application is a continuation-in-part of my application Ser. No. 396,366 filed Sept. 14, 1964, now abandoned.

This invention relates to an aqueous drilling fluid characterized by the presence therein of a mixed dimer acid-monocarboxylic acid salt of an imidazoline in an amount sufficient to maintain the stability of the borewall and the borehole, the mixed dimer acid having predominately 36 carbon atoms (i.e. derived from $C_{18}$ acids).

In the preferred embodiment, the salts are prepared from a mixed dimer acid-acetic acid salt of an imidazoline derived from coconut oil fatty acids and a polyamine of the formula

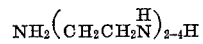

or mixtures thereof.

This invention relates to improved aqueous drilling fluids and to the use thereof in the drilling of boreholes.

Standard drilling operations employ drilling fluids to remove drilled cuttings from the borehole, to lubricate and cool the drill pipe and drill bit and to maintain the competence and desired physical properties of the borehole wall. The drilling fluid is maintained in surface tanks or pits from which it is normally pumped down the drill pipe, through the drill bit and back up the annular space between the drill pipe and the borehole wall to recirculate through the surface pits or tanks. Aqueous drilling fluids are most commonly used in drilling operations although other types, such as emulsion fluids and gaseous systems, are sometimes employed where applicable.

A wide variety of materials is normally used in the preparation of a drilling fluid to impart the physical and chemical properties required by the drilling operations. For example, to aid in the removal of drilled cuttings from the borehole both native and special clays, such as bentonites, are added to impart viscosity and thixotropicity to the drilling fluid. In addition weighting material such as barites, iron oxide, calcium carbonate, etc. are often employed. If drilled native clays and other drilled solids produce excessive viscosity in the drilling fluid, various thinners, such as lignosulfonate salts or querbracho, are employed. To control bacterial action on organic materials in the drilling fluid, bactericides may be necessary. Since one skilled in the art is aware of the myriad additives which have been used to impart various properties to drilling fluid, they will not be reviewed herein. See for example Schwartz et al., Surface Active Agents and Detergents, vol. II, Interscience Publishers (1958) pp. 696–701, and in the references cited therein, which are by reference incorporated into the present application. In general each additive is generally added to impart one function to the drilling fluid.

I have now discovered that the additive of this invention imparts many properties to the aqueous drilling fluid. Stated another way, the present additive is a multipurpose additive which imparts many useful functions to the drilling fluid resulting in an improvement of the overall efficiency of the drilling operation.

Among other functions, the present additive improves the properties of the borehole wall and facilitates both removal from the borehole and separation from the drilling fluid of the solids produced upon drilling. For example, the present additive maintains the competence of the borehole by inhibiting the swelling and/or disintegration of the borewall upon contact with water. Often contacting of the borewall with water causes the walls of the borehole to collapse and cave into the borehole. This results in cavities and enlargements in the well bore which interfere with subsequent operations and often causes the drill pipe to become stuck, thus making further drilling temporarily impossible.

In addition, the present additive renders drilled solids more easily removable from the borehole by the drilling fluid. The additive also makes the solids more easily separable from the drilling fluid in the surface pits or tanks.

The above functions are merely exemplary of those imparted to the fluid by the additives of this invention. Other functions are also imparted to the fluids so as to yield a commercially acceptable drilling fluid at a reasonable cost.

One method of preserving the competence of a borehole wall which swells and/or disintegrates upon contact with water is to employ a water-in-oil emulsion drilling fluid. In this way water-wetting of the water-sensitive borehole wall is avoided. However, the present invention maintains the competence of a water-sensitive borehole wall employing an aqueous drilling fluid without requiring the use of water-in-oil emulsions.

Additives found to be effective for the purpose described above belong to the general class of cyclic amidines. In particular, the substituted imidazolines in which the imidazoline molecule contains at least one aliphatic or cycloaliphatic hydrocarbon group containing from 8 to 32 carbon atoms are important. Cyclic imidazolines in which the 2-carbon atom is substituted by a long chain aliphatic hydrocarbon group are particularly easy to prepare and are very effective for the present use. However, it has been found that equally effective compounds, if not somewhat more effective in some instances, result when the aliphatic hydrocarbon group occurs as a substituent of one of the nitrogen atoms, or of a relatively small organic radical attached to one of the nitrogen atoms.

An important class of the reagents herein may be represented by the following general formula:

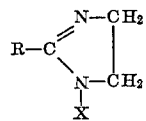

in which either R or X, or both, contain or consist of an eliphatic or cycloaliphatic radical containing from 8 to 32 carbon atoms.

In the most general classification of reagents suitable for my process, the symbol X may include another imidazoline ring, as described more fully below. Shown in the most general way, the compounds contemplated for use herein may be represented by the following formula:

$$R-C\begin{matrix} N-CH_2 \\ \\ N-CH_2 \\ | \\ D-R' \end{matrix}$$

where at least one of the groups R and R' is an aliphatic or cycloaliphatic hydrocarbon group containing from 8 to 32 carbon atoms and otherwise may be hydrogen or a hydrocarbon radical; and D is a divalent organic radical. In the more common reagents, D will be a relatively small organic radical, such as in the following examples of the grouping D—R':

$$-C_nH_{2n}-NR'-$$
$$-C_nH_{2n}-NH-\underset{O}{\overset{\parallel}{C}}-$$
$$-C_nH_{2n}-O-\underset{O}{\overset{\parallel}{C}}-$$
$$-C_nH_{2n}-NR'-C_nH_{2n}-NR'-$$
$$-\left(C_nH_{2n}-\underset{R'}{N}\right)_{0-5}-C_nH_{2n}-\underset{CH_2-CH_2}{N\underset{\diagdown}{\diagup}}\underset{}{\overset{R}{\underset{\parallel}{C}}}N$$

where $n$ is the numeral 1 to 6 and R' is hydrogen of an aliphatic or cycloaliphatic hydrocarbon radical.

In the simplest case, the group R' may be directly attached to the 1-nitrogen atom of the ring, as follows:

$$R-C\begin{matrix} N-CH_2 \\ \\ N-CH_2 \\ | \\ R' \end{matrix}$$

Examples of suitable substituted imidazolines in which the aliphatic or cycloalphatic group containing from 8 to 32 carbon atoms is a 2-position substituent, are as follows:

(1) 2-undecylimidazoline ($C_{11}H_{23}C$, N-H)

(2) 2-heptadecylimidazoline ($C_{17}H_{35} \cdot C$, N-H)

(3) 2-pentadecyl, 1-heptylimidazoline ($C_{15}H_{31} \cdot C$, N-$C_7H_{15}$)

(4) 2-octyl, 1-hydroxyethylimidazoline ($C_8H_{17} \cdot C$, N-$C_2H_4OH$)

(5) 2-nonyl, 1-decylimidazoline ($C_9H_{19} \cdot C$, N-$C_{10}H_{21}$)

(6) 2-oleylimidazoline ($C_{17}H_{33} \cdot C$, N-H)

(7) 2-cyclohexylethyl, 1-methylimidazoline ($C_6H_{11} \cdot C_2H_4 \cdot C$, N-$CH_3$)

(8) 2-abietyl, 1-ethyloxyethylimidazoline ($C_{19}H_{29} \cdot C$, N-$C_2H_4OC_2H_5$)

Suitable substituted imidazolines in which the aliphatic or cycloaliphatic group containing from 8 to 32 carbon atoms is the 1-position substituent or is a part of this substituent, are exemplified by the following:

(1) 1-octadecylimidazoline (HC, N-$C_{18}H_{37}$)

(2) 2-methyl, 1-octylimidazoline ($CH_3 \cdot C$, N-$C_8H_{17}$)

(3) 1-dodecyloxyethyl, 2-hydroxymethylimidazoline ($OHCH_2 \cdot C$, N-$C_2H_4OC_{12}H_{25}$)

(4) 1-oleoloxyethyl, 2-chloromethylimidazoline ($Cl \cdot CH_2 \cdot C$, N-$C_2H_4OOC_{17}H_{33}$)

(5) 1-N-decylaminoethyl, 2-ethylimidazoline ($C_2H_5 \cdot C$, N-$C_2H_4 \cdot NH \cdot C_{10}H_{21}$)

(6) 1-abietyl, 2-phenylimidazoline ($C_6H_5C$, N-$C_{19}H_{29}$)

Imidazolines containing basic nitrogen groups, in addition to those occurring in the imidazoline ring are particularly effective. Such products are readily prepared from the commercially available polyethylene polyamines, or from polyamines in which there are three or more amino groups and in which there is at least one primary amino group separated by two carbon atoms from a secondary or primary amino group. Examples of suitable preferred compounds of this type are the following:

(1) 2-heptadecyl, 1-aminoethylimidazoline $$C_{17}H_{35}-C\underset{N-CH_2}{\overset{N=CH_2}{\diagdown}}$$
$$\vert$$
$$C_2H_4.NH_2$$

(2) 2-heptadecyl, 1-diethylenediaminoimidazoline $$C_{17}H_{35}-C\underset{N-CH_2}{\overset{N=CH_2}{\diagdown}}$$
$$\vert$$
$$C_2H_4.NH.C_2H_4.NH_2$$

(3) 2-methyl, 1-hexadecylaminoethylaminoethylimidazoline $$CH_3.C\underset{N-CH_2}{\overset{N=CH_2}{\diagdown}}$$
$$\vert$$
$$C_2H_4.NH.C_2H_4NH.C_{16}H_{33}$$

(4) 1-dodecylaminopropylimidazoline $$H.C\underset{N-CH_2}{\overset{N=CH_2}{\diagdown}}$$
$$\vert$$
$$C_3H_6.NH.C_{12}H_{25}$$

(5) 1-stearoyloxyethylaminoethylimidazoline $$H.C\underset{N-CH_2}{\overset{N=CH_2}{\diagdown}}$$
$$\vert$$
$$C_2H_4.NH.C_2H_4OOC.C_{17}H_{35}$$

(6) 2-ethyl, 1-(N,N dodecyl, hydroxyethyl)aminoethyl-imidazoline $$C_2H_5.C\underset{N-CH_2}{\overset{N=CH_2}{\diagdown}}$$
$$\vert$$
$$C_2H_4.N.C_2H_4OH_4$$
$$\vert$$
$$C_{12}H_{25}$$

(7) 1-stearamidoethylaminoethylimidazoline $$H.C\underset{N-CH_2}{\overset{N=CH_2}{\diagdown}}$$
$$\vert$$
$$C_2H_4.NH.C_2H_4NHOC.C_{17}H_{35}$$

(8) 1-(N-dodecyl)-acetamidoethylaminoethylimidazoline $$H.C\underset{N-CH_2}{\overset{N=CH_2}{\diagdown}}$$
$$\vert$$
$$C_2H_4.N.C_2H_4.NHOC.CH_3$$
$$\vert$$
$$C_{12}H_{25}$$

(9) Chloroparaffin alkylation product of 1-aminoethyl, 2-methylimidazoline $$CH_3.C\underset{N-CH_2}{\overset{N=CH_2}{\diagdown}}$$
$$\vert$$
$$C_2H_4NH.C_{25}H_{46}Cl_5$$

Although imidazolines containing at least one aliphatic or cycloaliphatic hydrocarbon radical having from 8 to 32 carbon atoms are effective, in general, the most effective reagents and those having the most desirable solubility characteristics are those in which the aliphatic or cycloaliphatic group contains from 10 to 20 carbon atoms. Examples of such preferred groups are decyl, oleyl, abietyl, stearyl, and the like.

The additives of the present invention, since they contain an imidazoline ring, may, in general, be alkylated to form either a 1-alkyl-substituted imidazoline, or a quaternary ammonium salt, where the alkyl group is attached to either or both the 1 and 3 nitrogen atoms. For example, using cetyl bromide as a typical alkylating agent, the following reactions may be carried out:

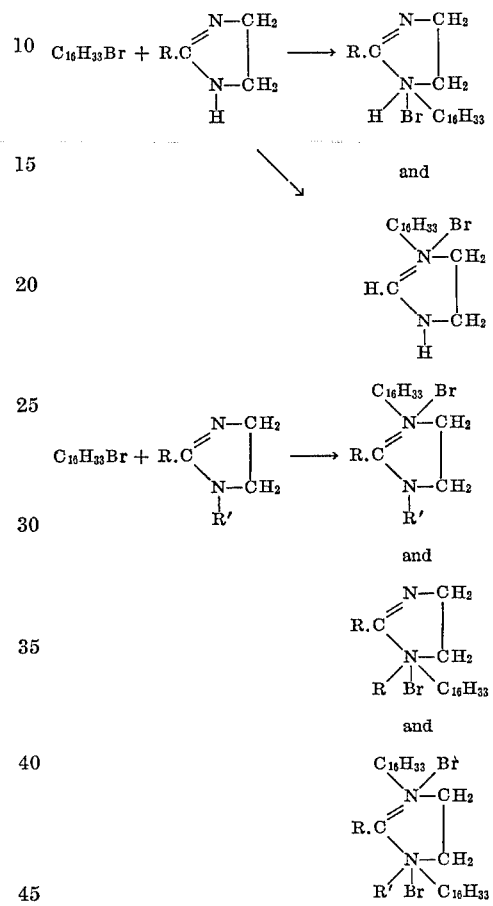

Instead of the cetyl bromide used in the examples above, one may use other alkylating agents such as methyl bromide, benzyl chloride, ethyl sulfate, dichloroethyl ether, chloroparaffin, etc., to obtain equally suitable derivatives of imidazolines which may be employed in the present process.

For details of preparation of various imidazolinium salts, such as those mentioned above, see, for example, Shepard and Shonle, J.A.C.S., 69, 2269 (1947).

Although the additives are imidazolines, in many instances these compounds may, for example, be in the form of their salts, either with organic or inorganic acids. Being relatively strong bases, the imidazolines readily form such salts, and where the reagent contains basic groups in addition to the imidazoline ring nitrogen atoms, they may form di- or polysalts. Examples of acids which may be used to form such salts are hydrochloric acid, sulfuric acid, acetic acid, oxalic acid, maleic acid, oleic acid, abietic acid, phosphoric acid, petroleum sulphonic acid, naphthenic acid, rosin, phenylacetic acid, benzoic acid, and the like.

While the additives are imidazolines and have been illustrated as single ring compounds, it should be pointed out that in some instances additives containing two or more heterocyclic rings, such as two imidazoline rings may be employed. For example, if one reacts one mole of triethylene tetramine with a mole of stearic acid to form a substituted heptadecylimidazoline, and then reacts this further with another mole of a carboxylic acid at a suitable high temperature, a diimidazoline is obtained.

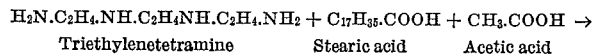
Triethylenetetramine    Stearic acid    Acetic acid

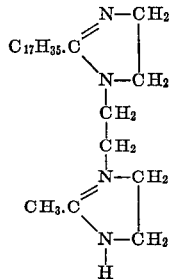

Similarly,

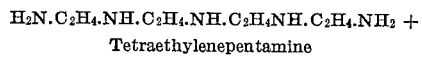
Tetraethylenepentamine

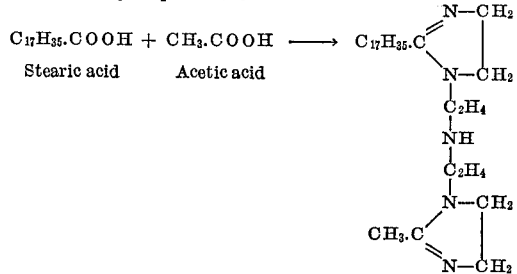
Stearic acid    Acetic acid

Such diimidazolines are intended to be included when reference is made to substituted imidazolines herein or in the claims.

Many obvious simple derivatives of the herein described agents may be prepared which are also effective. For example, I have defined the groups R and R' in the structural formulae above as being members of the class consisting of hydrogen, aliphatic, and cycloaliphatic hydrocarbon groups. Actually, the use of halogenated hydrocarbon groups appears to yield equally effective reagents, and chlorohydrocarbon groups, particularly, are readily introduced during synthesis. Since the chlorine atoms in these groups are relatively non-reactive and yield products with solubilities similar to the hydrocarbon derivative, they do not differ greatly in behavior from the corresponding hydrocarbon derivative.

Imidazolines containing a relatively high molecular weight hydrocarbon radical, and substituted in the 4- and/or 5-ring positions are also effective.

In addition, the carbons of the ring may be substituted, for example

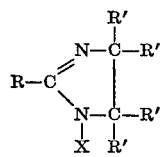

where the R"s, which may be the same or different, are hydrogen or a substituted group such as alkyl, i.e. methyl, ethyl, propyl, etc.

In addition to imidazolines, other related compounds can also be employed, including other cyclic amidines, such as for example the tetrahydropyrimidines. These compounds have an additional ring —CH₂— group between the heterocyclic ring nitrogen. Thus, while an imidazoline has the formula

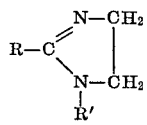

a tetrahydropyrimidine has the formula

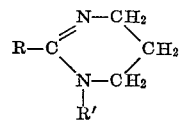

These are prepared from amines having a chain of three carbon atoms between the nitrogens instead of two carbons as in the case of imidazoline. Thus, while an imidazoline is prepared from NH₂CH₂CH₂NH₂, the tetrahydropyrimidine is prepared from NH₂CH₂CH₂CH₂NH₂. Tetrahydropyrimidines analogous to the imidazolines described above can be employed.

Similarly, oxazolines which can be considered to be acylated alkanol amines can also be employed, for example those of the formula

and substituted derivatives thereof. These can be prepared, for example, according to the following equation:

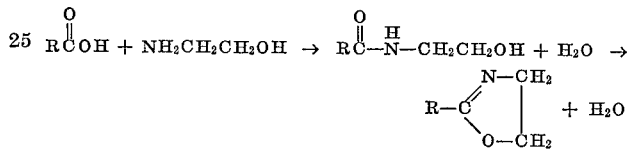

These are analogous to imidazolines except that in- has one heterocyclic nitrogen; the ring has one heterocyclic nitrogen and one heterocyclic oxygen. Oxazolenes analogous to the imidazolines described above can also be employed.

In addition, in certain instances amides which are pregenitors of the above cyclic amidines and oxazolenes may be employed. For example, when a fatty acid is reacted with a polyamine and only one mole of water is removed, an amino amide is formed:

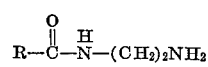

These may be further reacted to form cyclic amidines with the evolution of a second mole of water. Stated another way, amides which are pregenitor amides of imidazolines, tetrahydropyrimidines, and oxazolines may also be employed in certain instances. Also mixtures of these amides and the corresponding heterocyclic compound may also be employed. In addition, polyamides of the polyamines can also be employed, for example:

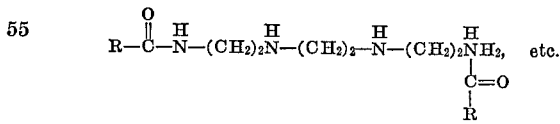

In summary, the additives of this invention are acylated amines and most particularly acylated polyamines. This term includes aliphatic and heterocyclic polyamines, for example

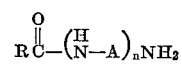

such as those described in U.S. Pat. 2,598,213, imidazolines

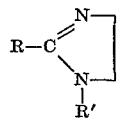

for example of the type described in U.S. 2,466,517 and Re. 23,227, tetrahydropyrimidines such as

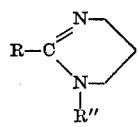

for example of the type described in U.S. Pat. 2,640,029, oxazolenes and the like; where A is alkylene such as ethylene, propylene, etc. and R' and R'' are moieties of the polyamine. See U.S. Pat. 2,527,296 for examples of oxazolines.

These may be illustrated by the following reactions:

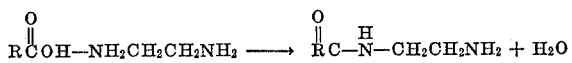

However, when two molds of water are removed per carboxylic acid, the molecule is cyclized to form an imidazoline in the case of an ethylene diamine or a derivative thereof and a tetrahydropyrimidine in the case of a propylene diamine or a derivative thereof.

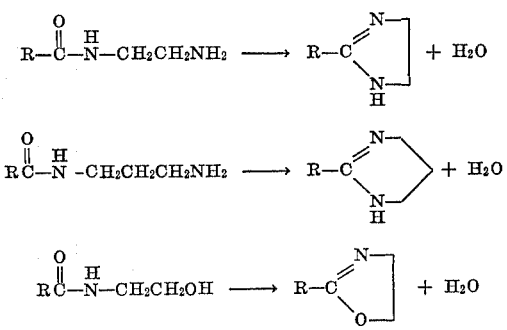

Substituted derivatives thereof can also be employed All of the patents described herein are by reference incorporated into the present application.

The acylated amines employed should be soluble of dispersible in the drilling fluid. This is often effected by employing salts thereof.

The concentration at which the additives of this invention are effective is dependent among other things on the specific additive employed and on various aspects of the drilling operation. For example, as the solids content of the drilling fluid increases, the concentration of these agents is generally increased accordingly to compensate for additional solid matter present. Although the additives can be employed in high solids drilling fluids, for example up to 13% or higher, they are particularly effective in low solids drilling fluids containing 0% to 7% solids by volume. At high penetration rates of the drill bit, the amount of solids being transported by the drilling fluid in the annular space is increased and additional amounts of the agents of this invention are generally injected to compensate for this. The rate of water addition to the drilling fluid system must be monitored and sufficient agent injected to maintain the proper concentration.

In general, the amount of additive employed is sufficient to insure the competence of the drillhole, the removal of the drilled cuttings from the borehole, and the separation of the drilled cuttings from the drilling fluid in the surface pits. In practice, concentrations of at least about 25 p.p.m., such as 25–10,000 p.p.m., for example 50–1,000 p.p.m., but preferably 100–500 p.p.m. are employed, based on total volume of drilling fluid in the system. Although larger amounts of additive may be employed, there is generally no economic advantage in adding more. In practice optimum concentrations generally range from 200–300 p.p.m. After an initial injection of additives to the desired concentration, the injection is continued at a rate sufficient to compensate for the additives removed from the drilling fluid system by adhering to the drilled solids that are removed in the surface pits or tanks, on the borehole walls and on the downhole equipment such as drill pipe, casing, etc. In addition, sufficient additive is injected to compensate for any water or solids deliberately added to the drilling fluid system.

To demonstrate the benefits to be derived from the application of this invention in the drilling of boreholes, several test wells were monitored and data recorded. The following examples are presented to demonstrate the improved conditions that were imparted to the drilling fluid by the use of this invention. The cases recorded herein are intended as examples only and should not be construed as limiting this invention to those conditions present in the test wells.

EXAMPLE 1

This invention was applied in a well drilled in Morris County of East Texas. The test well was drilled to a depth of 7178 feet using a low solids gel-polymer drilling fluid. After setting 9⅝ inch casing to a depth of 4286 feet, the drilling fluid used was maintained within the following measured parameters to the 7178 foot depth.

Solids contents: 1 to 4% by volume
Weights: 8.6 to 9.1 lbs. per gallon
Viscosity: 30 to 34 funnel, Sec. API
pH: 7.0 to 9.0
Oil Content: 0%

At the 7178 foot depth, the addition of the additive was initiated and continued until 12 gallons had been injected; thereby giving the 1100 barrel drilling fluid system a 250 p.p.m. by volume concentration of the additive. When the 250 p.p.m. concentration was obtained, the injection of the additive was reduced to approximately two gallons in each eight hour period during which the drill bit was rotating at the bottom of the hole. This continuous injection was necessary to compensate for the additive adsorbed on removed formation cuttings, and for the addition of water to the drilling fluid system.

One hour after the initial addition of the additive, the geologist in attendance at the well reported that the cuttings being removed at the shale-shaker device were better defined and more representative of the formation being drilled at that time than those cuttings being removed prior to the addition of the additive. The indication is that the cuttings were being transported out of the borehole and removed more efficiently due to the coating and protective action on the cuttings and borehole walls by the additive.

Shale and limestone were the predominant formations being drilled below the 4286 foot casing point. To drill the interval from 4286 feet to 7178 feet, 12 drill bits were required. In all but two of the twelve instances in which the drill pipe was removed from the hole and then run back in the hole with a new drill bit, the drilling crew found it necessary to wash out portions of the hole with the drilling fluid so that the drill bit could be returned to bottom, thus indicating some disintegration and swelling. The depths that had to be washed out ranged from 30 to 205 feet of fill-up at the bottom of the hole.

When bit number 16 was being run into the hole, the interval from 5340 to 5760 foot depth had to washed out first, and then the interval from 6930 to 7109 foot depth had to be washed out and circulated with the drilling fluid.

Bit number 17 had just been installed and run into the hole at a depth of 7178 feet when the addition of the additive was initiated. In the interval drilled from 7178 feet to 10,096 feet, the additive was applied as described above. Sixteen bits were used in the 2918 foot interval drilled with the additive in use. In none of the sixteen trips required to remove the drill pipe, to change bits, and to return the drill pipe to the hole were any tight spots in the drilled formations, or fill-up at the bottom of the hole, noted. This indicates no swelling or disintegration of the borehole walls into the borehole.

Drilling fluid conditions maintained in the interval from the 7178 foot depth to 10,096 foot depth were:

Solids: 2½ to 3½ by volume
Weight: 8.8 to 9.1 bbs./gallon
Viscosity: 31 to 33 funnel, Sec, API
pH: 7.5 to 9.0
Oil content: 0%

EXAMPLE 2

This invention was applied in another test well drilled in Franklin County of East Texas. Of primary interest here was the performance of the invention when applied in formations commonly known in the oil industry as "gumbo." Gumbo refers to formation composed primarily of soft shales and clays.

Although rates of penetration are normally much faster in gumbo formations than in hard rock formations, the drillers frequently must control the penetration of the bit to allow adequate time for the drilled solids to be removed by the drilling fluid system. If the bit is allowed to penetrate too fast, the drilled solids may eventually clog the drill bit and thereby greatly reduce the drilling rate. This clogging ("balling up") of the bit is a function of the bit design and the available hydraulic power of the drilling fluid system used to remove the drilled cuttings.

The introduction of water to the drilled gumbo by the drilling fluid system frequently creates semi-solid masses that are most difficult to transport up the annulus of the borehole and into the drilling fluid pits or tanks at the surface. Rather than the cuttings being small individual particles, as is true with harder formations, the drilled gumbo tends normally to gather into larger masses.

Two comparable wells were drilled about one-half mile east of the test well where the invention was applied. All three wells were located in Franklin County of East Texas. On the first of the two comparable wells, three 12½ inch drill bits were used to drill from a depth of 118 feet to 5018 feet for a total of 4900 feet in 114¼ hours of rotating the drill bits. On the second of the comparable wells, three 12¼ inch drill bits were used to drill from a depth of 145 feet to 4977 feet for a total of 4832 feet in 114 hours of rotating the drill bits.

On the test well where the invention was applied, only two 12¼ inch drill bits were required to drill from a depth of 127 feet to 4960 feet for a total of 4833 feet drilled in only 87 hours of rotating the drill bits. The reduction in rotating hours from about 114, when the invention was not used, to 87 hours when the invention was used, represents a 23.7% savings in time in drilling these comparable sections of the borehole.

The average drilling rates for the comparable wells were 42.8 to 42.4 feet per hour. For the test well where the invention was applied, the average drilling rate was 55.5 feet per hour. The increase in drilling rate from an average of 42.6 feet per hour, when the invention was not used, to 55.5 feet per hour when the invention was applied represents an increase of over 30%.

The reduction in the number of hours required to drill this comparable portion of the boreholes and the resultant increased penetration rate when the invention was applied represents a considerable economic savings to the company drilling the well. In addition when the invention was applied the use of one less drill bit and elimination of the time required to remove the drill pipe from the borehole, change drill bits, and lower the drill pipe back in the borehole represents still further savings in time and dollars as well.

The above data indicates that the use of an additive of this invention in drilling operations results in more efficient drilling, as evidenced by the increased penetration rates, and more efficient removal of the drilled solids from the borehole, as indicated by the arrival of the solids at the surface tanks and pits in masses of a size more easily transported by the drilling fluid system. From the drilling contractor's point of view, approximately 27 hours drilling time were saved along with a related cost saving by employing this additive as compared to drilling operation where no additive was employed.

The additive employed in the operation of the above examples was a solution of a mixed dimer acid-acetic acid salt of an imidazoline formed from coconut oil fatty acid and polyethyleneamines comprising a mixture of diethylenetriamine, triethylene tetramine, and tetraethylene pentamine. The formulation employed was a water-alcohol solution thereof containing 15% imidazoline, 8% dimer acid, 10% acetic acid, and 47% solvent, calculated as weight percent.

In both examples above the additive, including solvent, was applied at an approximate concentration of 250 parts per million based on the total volume of the drilling fluid system.

Additives of this invention include a mixed dimer acid-monocarboxylic acid salt of an imidazoline. The monocarboxylic acids are aliphatic, arylic, cycloaliphatic, etc., carboxylic acids such as those of the acetic series, i.e. the

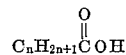

series, such as acetic, propionic, butyric, etc., lauric, stearic, etc., arylic series such as benzoic, alkyl benzoic, arylalkyl phenyl acetic, etc. unsaturated such as oleic, linoleic, etc. cycloaliphatic such as naphthenic, etc.

"Dimer acids" contain predominantly thirty-six carbon atoms and are obtained commercially by the dimerization of mono-, di- and polyunsaturated fatty acids of their esters such, for example, as the fatty acids derived from fatty oils, such as soya oil, castor oil, tall oil, etc. They are usually of highly complex structure and may be either acylic or alicyclic in nature, and are available, for example, from Emery Industries, Inc., under the trade name of "Empol" dimer acids. They are described in a publication of Emery Industries, Inc., entitled "Empol Dimer Acids," dated 1963 and their chemistry is described in many scientific publications such as Bradley and Johnston, "Drying Oils and Resins," Ind. Eng. Chem. 32, 802–809 (1940) and others, some of which are summarized in Markley, "Fatty Acids," published in 1947 by Interscience Publishers, Inc., N.Y.C., pp. 328–332. Included among such additives is the dimerized fatty acid supplied by Emery Industries, Inc.

The following are typical examples of commercial dimeric acids. In general these are derived primarily from mixtures of oleic and linoleic acids, i.e. $C_{18}$ unsaturated fatty acids.

SPECIFICATIONS OF EMPOL DIMER ACIDS
(EMERY INDUSTRIES)

|  | Empol 1014 | Empol 1018 | Empol 1022 | Empol 1024 |
|---|---|---|---|---|
| Neutralization equivalent | 288–294 | 287–299 | 298–301 | 289–301 |
| Acid value | 191–195 | 188–196 | 186–194 | 186–194 |
| Saponification value | 195–199 | 192–198 | 191–199 | 191–199 |
| Color, Gardner 1953 (max.) | 8 | 8 | 9 | 9 |
| Monobasic acids (percent max.) | 1.5 | 1 | 2–5 | 1 |

TYPICAL COMPOSITIONS OF EMPOL DIMER ACIDS

|  | Empol 1014 | Empol 1018 | Empol 1022 | Empol 1024 |
|---|---|---|---|---|
| Dimer acid | 95 | 83 | 77 | 79 |
| Trimer acid | 4 | 17 | 20 | 21 |
| Monobasic acids | 1 | Trace | 3 | Trace |
| Dimer: Triver molar ratio | 36:1 | 7:1 | 6:1 | 6:1 |

The specific dimeric acid employed in the above examples is Empol 1022.

Compositions of the above type are preferred, i.e. acylated amines having at least 8 carbons, but preferably at least 10 carbons, employed as their salts to make them more water soluble or dispersible. In general, acylated amines which are substantially water insoluble are preferred in the form of their water soluble or dispersible salts. The most preferred embodiment is a substituted water insoluble imidazoline in the form of its water soluble or dispersible salts.

Since the compositions of drilling fluids themselves are well known to those skilled in the art and can vary widely depending on the particular drilling operation, no attempt will be made herein to specifically describe these fluids. Many drilling fluids are known or will be devised in the future. The essence of this invention relates to the use of the acylated amines herein defined in conjunction with conventional or other drilling muds which are capable of improving the drilling operation.

Having thus described my invention what I claim as new and desire to obtain by Letters Patent is:

1. An aqueous drilling fluid characterized by the presence therein of up to 13% by volume of insoluble solids and a mixed dimerized fatty acid-monocarboxylic acid salt of an imidazoline in an amount of 25.0–10,000 p.p.m. based on the total volume of drilling fluid, the mixed dimerized fatty acid having predominantly 36 carbon atoms, the monocarboxylic acid being an acid selected from the group consisting of (1) an acid having the formula

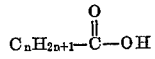

where $n$ is 1–17,
(2) benzoic acid,
(3) oleic acid,
(4) linoleic acid, and
(5) naphthenic acid, and said imidazoline being an imidazoline derived from coconut oil fatty acid and polyamine selected from the group consisting of (1) diethylenetriamine, (2) triethylenetetramine, (3) tetraethylenepentamine, and (4) mixtures thereof.

2. The aqueous drilling fluid of claim 1 where the monocarboxylic acid is acetic acid.

3. The aqueous drilling fluid of claim 2 wherein polyamine is a mixture of diethylenetriamine, triethylenetebramine and tetraethylenepentamine.

4. The aqueous drilling fluid of claim 3 where the dimerized fatty acid has an acid value of 186–194.

5. A process of drilling a borehole comprising adding the aqueous drilling fluid of claim 1 to said well in contact with the shale-containing formations and circulating said drilling fluid in the well while drilling through the shale-containing formations.

6. The process of claim 5 where the monocarboxylic acid is acetic acid.

7. The process of claim 6 wherein polyamine is a mixture of diethylenetriamine, triethylenetetramine and tetraethylenepentamine.

8. The process of claim 7 where the dimerized fatty acid has an acid value of 186–194.

References Cited

UNITED STATES PATENTS

| | | | |
|---|---|---|---|
| 2,894,907 | 7/1959 | Newcombe et al. | 252—8.55 |
| 2,950,246 | 8/1960 | Hughes et al. | 252—8.55 |
| 3,017,351 | 1/1962 | Scott et al. | 252—8.5 |
| 3,210,274 | 10/1965 | Caruso | 252—8.5 X |

HERBERT B. GUYNN, Primary Examiner

U.S. Cl. X.R.
260—309.6